US012436204B2

(12) United States Patent
Li et al.

(10) Patent No.: US 12,436,204 B2
(45) Date of Patent: Oct. 7, 2025

(54) METHOD FOR TESTING AND EVALUATING SHORT-CIRCUIT WITHSTAND CAPABILITY OF PRESS-PACK POWER COMPONENT

(71) Applicant: Chongqing University, Chongqing (CN)

(72) Inventors: Hui Li, Chongqing (CN); Renkuan Liu, Chongqing (CN); Ran Yao, Chongqing (CN); Wei Lai, Chongqing (CN); Zeyu Duan, Chongqing (CN); Zheyan Zhu, Chongqing (CN); Bailing Zhou, Chongqing (CN); Siyu Chen, Chongqing (CN); Jinyuan Li, Chongqing (CN); Zhongyuan Chen, Chongqing (CN)

(73) Assignee: Chongqing University, Chongqing (CN)

( * ) Notice: Subject to any disclaimer, the term of this patent is extended or adjusted under 35 U.S.C. 154(b) by 154 days.

(21) Appl. No.: 18/484,486

(22) Filed: Oct. 11, 2023

(65) Prior Publication Data

US 2024/0142546 A1 May 2, 2024

(30) Foreign Application Priority Data

Nov. 1, 2022 (CN) .......................... 202211356605.5

(51) Int. Cl.
*G01R 31/52* (2020.01)
*G01R 31/26* (2020.01)

(52) U.S. Cl.
CPC ......... *G01R 31/52* (2020.01); *G01R 31/2601* (2013.01); *G01R 31/2619* (2013.01)

(58) Field of Classification Search
CPC ... G01R 31/52; G01R 31/2601; G01R 31/2619; G01R 31/31924; H01M 10/48
USPC ...................................... 324/750.01
See application file for complete search history.

(56) References Cited

U.S. PATENT DOCUMENTS

| 11,262,406 B2 * | 3/2022 | Du ..................... G01R 31/396 |
| 2022/0196756 A1 * | 6/2022 | Liu ..................... H01M 10/425 |
| 2024/0413414 A1 * | 12/2024 | César ................ H01M 10/0525 |

* cited by examiner

*Primary Examiner* — Roberto Velez
(74) *Attorney, Agent, or Firm* — VIERING, JENTSCHURA & PARTNER mbB

(57) ABSTRACT

Disclosed is a method for testing and evaluating a short-circuit withstand capability of a press-pack power component. The method includes: building a test platform; obtaining a voltage level, a pressure load, an environment temperature, and a maximum junction temperature fluctuation range of a to-be-tested component in an actual working condition; separately testing short-circuit withstand capabilities of the to-be-tested press-pack power component; monitoring, in real time, changes of a component short-circuit current, a collector-emitter voltage, and a grid-emitter voltage until the to-be-tested press-pack power component fails due to short circuit; correspondingly obtaining a relationship between a voltage and each of a short-circuit critical energy and a critical temperature, a relationship between a pressure and a short-circuit current, and a relationship between a temperature and a short-circuit current; obtaining a relationship between a short-circuit withstand capability of the to-be-tested press-pack power component and each of a voltage, a pressure, and a temperature.

8 Claims, 2 Drawing Sheets

METHOD FOR TESTING AND EVALUATING SHORT-CIRCUIT WITHSTAND CAPABILITY OF PRESS-PACK POWER COMPONENT

CROSS REFERENCE TO RELATED APPLICATION

This patent application claims the benefit and priority of Chinese Patent Application No. 202211356605.5, filed with the China National Intellectual Property Administration on Nov. 1, 2022, the disclosure of which is incorporated by reference herein in its entirety as part of the present application.

TECHNICAL FIELD

The present disclosure pertains to the field of power electronics component technologies, and relates to a method for testing and evaluating a short-circuit withstand capability of a press-pack power component.

BACKGROUND

A short-circuit fault is one of common faults in power electronics equipment. During a short circuit, a power component needs to carry about 5-6 times a rated current in an extremely short time, causing a junction temperature of the component to rise rapidly. If a protection circuit cannot operate within a short-circuit withstand capability of the power component, the power component may be permanently damaged, thereby affecting reliability of the entire system. Therefore, accurately evaluating the short-circuit withstand capability of the power component is a basis for establishing parameters of the protection circuit, which are very important for system reliability.

Currently, a welding package and a crimp package are two mainstream packaging forms of power components. Compared with a welding-packaged power component, a press-pack power component has advantages of short-circuit failure, double-sided heat dissipation, and low thermal resistance. This makes the press-pack power component more suitable for high-voltage and high-power-density applications. However, unlike the welding-packaged power component, the press-pack power component has a complex current-thermal-mechanical coupling relationship inside, and a pressure directly affects a current and a temperature of the component.

However, because the welding-packaged power component has a longer application time and a wider application range, most test and evaluation methods that are currently widely used, including a method for evaluating a short-circuit withstand capability, are formulated based on the welding-packaged power component. In this method, only an internal current-thermal relationship of the welding-packaged power component is considered, and impact of the pressure is not considered. Consequently, an evaluation result is inaccurate when the method is applied to the press-pack power component. Therefore, it is of great importance to invent a novel method for testing and evaluating a short-circuit withstand capability of a press-pack power component, to accurately evaluate a short-circuit withstand capability of the press-pack power component, precisely set the parameters of the protection circuit, and improve system reliability.

SUMMARY

In view of this, the present disclosure aims to provide a method for testing and evaluating a short-circuit withstand capability of a press-pack power component. The method of the present disclosure resolves a problem of inaccurate evaluation of a short-circuit withstand capability of a press-pack power component by using a conventional test and evaluation method, thereby improving evaluation accuracy of a to-be-tested component.

To achieve the above objective, the present disclosure provides the following technical solutions:

A method for testing and evaluating a short-circuit withstand capability of a press-pack power component specifically includes the following steps:

S1: building a test platform suitable for a short-circuit withstand capability of a press-pack power component;

S2: obtaining a voltage level, a pressure load, an environment temperature, and a maximum junction temperature fluctuation range of a to-be-tested press-pack power component in an actual working condition;

S3: customizing a test scheme of the short-circuit withstand capability, which specifically includes: separately testing short-circuit withstand capabilities of the to-be-tested press-pack power component at different voltages, pressures, and temperature levels; monitoring, in real time, changes of a component short-circuit current $I_S$, a collector-emitter voltage $V_{CE}$, and a grid-emitter voltage $V_{GE}$ until the to-be-tested press-pack power component fails due to short circuit; and correspondingly obtaining a relationship between a voltage and each of a short-circuit critical energy $E_{CR}$ and a critical temperature $T_{CR}$, a relationship between a pressure and a short-circuit current, and a relationship between a temperature and a short-circuit current; and S4: obtaining, according to test results obtained under different voltages, pressures, and temperatures, a relationship between a short-circuit withstand capability of the to-be-tested press-pack power component and each of a voltage, a pressure, and a temperature.

Further, in step S1, the test platform includes a short-circuit energy supply module, a control module, a measurement module, and an environment control module;

the short-circuit energy supply module includes a high-voltage direct current (DC) power supply and a capacitor group that are connected in parallel, to provide impact energy for a short-circuit withstand test;

the control module includes a signal generator and a drive circuit that are connected in series, to control a to-be-tested module to be enabled;

the measurement module includes a voltage probe and a current probe, to monitor and acquire characteristic parameters such as a short-circuit current $I_S$, a collector-emitter voltage $V_{CE}$, and a grid-emitter voltage $V_{GE}$ in a process of the short-circuit withstand test; and the environment control module includes a high-voltage DC power supply, a pressure fixture, and a constant-temperature experimental box, to respectively control changes of a voltage, a pressure, and a temperature.

Further, in step S2, a test voltage $U_i$, a test pressure $F_i$, and a test temperature $T_i$ are determined according to the actual working condition of the to-be-tested press-pack power component.

The test voltage $U_i$ includes ±10% steps of an actual working voltage $U_0$ so that testing is performed at voltage levels including $U_0-20\%$, $U_0-10\%$, $U_0$, $U_0+10\%$, and $U_0+20\%$. According to a specific application condition, a voltage test range may be increased and the step may be reduced.

The test pressure $F_i$ uses a recommended pressure load value $F_0$ of the to-be-tested press-pack power component in the actual working condition as a reference, and a maximum pressure load value $F_{0-max}$ as an upper limit; within the test pressure $F_i \in (0, F_0]$ interval, testing is performed at least at 5 pressure levels within $(0, F_0/2]$ interval, testing is performed at least at 3 pressure levels; and within the test pressure $F_i \in (F_0, F_{0-max}]$ interval, testing is performed at least at 2 pressure levels. According to a specific application condition, a quantity of test pressure levels may be increased.

The test temperature $T_i$ includes one or more values between $T_{EN\_min}$ actual application as a lower limit, and a maximum junction temperature $T_{j\_max}$ as an upper limit; where the application working condition includes a minimum value $T_{j\_min}$ of junction temperature fluctuation, and testing is performed at least at 4 temperature levels. According to a specific application condition, a quantity of test temperature levels may be increased, and a test temperature range may be appropriately adjusted.

Further, in step S3, a short-circuit current $I_S$ and a collector-emitter voltage $V_{CE}$ are monitored in real time in a process of testing the short-circuit withstand capability, and when the short-circuit current $I_S$ instantly rises to at least 2 times an initial value and the collector-emitter voltage $V_{CE}$ drops rapidly to about 0 V, it can be determined that the to-be-tested press-pack power component fails due to short circuit.

Further, in step S3, the testing short-circuit withstand capabilities of the to-be-tested press-pack power component at different voltage levels specifically includes: separately testing a short-circuit withstand capability of the to-be-tested press-pack power component at a selected voltage level, and monitoring, in real time, a component short-circuit current Is, a collector-emitter voltage $V_{CE}$, and a grid-emitter voltage $V_{GE}$ until the to-be-tested press-pack power component fails due to short circuit;

(1) calculating a short-circuit critical energy $E_{CR}$ of the to-be-tested press-pack power component based on the short-circuit current $I_S$ and the collector-emitter voltage $V_{CE}$ according to equation:

$E_{CR} = \int_0^{t_{SCWC}} V_{CE}(t) \cdot I_S(t) \cdot dt$, where $t_{SCWC}$ is a short-circuit withstand time of the to-be-tested press-pack power component, namely, a maintenance time from a beginning of testing to a short-circuit failure of the to-be-tested press-pack power component;

(2) fitting a relationship between a test voltage $U_i$ and a short-circuit critical energy $E_{CR}$ based on the test results at the different voltage levels according to equation:

$E_{CR} = f_E(U_i)$, where $f_E(U_i)$ is a fitting relationship function between a test voltage $U_i$ and a short-circuit critical energy $E_{CR}$; and (3) obtaining a relationship between a test voltage $U_i$ and a critical temperature $T_{CR}$ according to equation:

$$T_{CR}(U_i) = \frac{f_E(U_i)}{K_{chip}} + T_{EN},$$

where $K_{chip}$ is a parameter related to a material and a structure of a chip used by the to-be-tested press-pack power component, and $T_{EN}$ is the environment temperature.

Further, in step S3, the testing short-circuit withstand capabilities of the to-be-tested press-pack power component at different pressure levels specifically includes: separately testing a short-circuit withstand capability of the to-be-tested press-pack power component at a selected pressure level, and monitoring, in real time, changes of a component short-circuit current $I_S$, a collector-emitter voltage $V_{CE}$, and a grid-emitter voltage $V_{GE}$ until the to-be-tested press-pack power component fails due to short circuit; and fitting a relationship between a test pressure $F_i$ and a component short-circuit current $I_S$ based on the test results at the different pressure levels according to equation:

$I_S = f(F_i)$, where $f_F(F_i)$ is a fitting relationship function between the test pressure $F_i$ and the component short-circuit current $I_S$.

Further, in step S3, the testing short-circuit withstand capabilities of the to-be-tested press-pack power component at different temperature levels specifically includes: separately testing a short-circuit withstand capability of the to-be-tested press-pack power component at a selected temperature level, and monitoring, in real time, changes of a component short-circuit current $I_S$, a collector-emitter voltage $V_{CE}$, and a grid-emitter voltage $V_{GE}$ until the to-be-tested press-pack power component fails due to short circuit; and fitting a relationship between a temperature $T_i$ and a component short-circuit current $I_S$ based on the test results at the different temperature levels according to equation:

$I_S = T_i^k \cdot f_F(F_i)$, where k is a parameter related to a characteristic of a chip used by the to-be-tested press-pack power component, and $f_F(F_i)$ is a fitting relationship function between a test pressure $F_i$ and the component short-circuit current $I_S$.

Further, in step S4, an obtained relationship between a short-circuit withstand capability of the to-be-tested press-pack power component and each of a voltage, a pressure, and a temperature is according to equation:

$$t_{SCWC} = \frac{K_{chip}[T_{CR}(U_i) - T_i]}{U_i \cdot T_i^k \cdot f_F(F_i)},$$

where $K_{chip}$ is a parameter related to a material and a structure of a chip used by the to-be-tested press-pack power component, $T_{CR}$ is the critical temperature, $U_i$ is a test voltage, $T_i$ is a test temperature, k is a parameter related to a characteristic of the chip used by the to-be-tested press-pack power component, and $f_F(F_i)$ is a fitting relationship function between a test pressure $F_i$ and the component short-circuit current $I_S$.

The present disclosure has the following beneficial effects:

(1) The method for testing a short-circuit withstand capability provided in the present disclosure fully considers the application working conditions of the press-pack power component, and comprehensively considers impact of the voltage, the pressure, and the temperature on the short-circuit withstand capability of the press-pack power component. In addition, the test scheme of the short-circuit withstand capability is scientifically optimized according to the application working condition, reducing test difficulty of the short-circuit withstand capability and improving the economic efficiency of testing.

(2) The method for evaluating a short-circuit withstand capability provided in the present disclosure fully considers impact of "current-thermal-mechanical" on the short-circuit withstand capability of the press-pack power component, improving evaluation accuracy of the short-circuit withstand capability of the press-pack power component, helping accurately set parameters of a protection circuit, and improving system reliability.

Other advantages, objectives and features of the present disclosure will be illustrated in the subsequent description in some degree, and will be apparent to those skilled in the art in some degree based on study on the following description, or those skilled in the art may obtain teachings by practicing the present disclosure. The objectives and other advantages of the present disclosure can be implemented and obtained by the description below.

BRIEF DESCRIPTION OF THE DRAWINGS

In order to make the objectives, technical solutions, and advantages of the present disclosure more clear, the present disclosure will be preferably described in detail below with reference to the accompanying drawings.

DETAILED DESCRIPTION OF THE EMBODIMENTS

Figure 1:
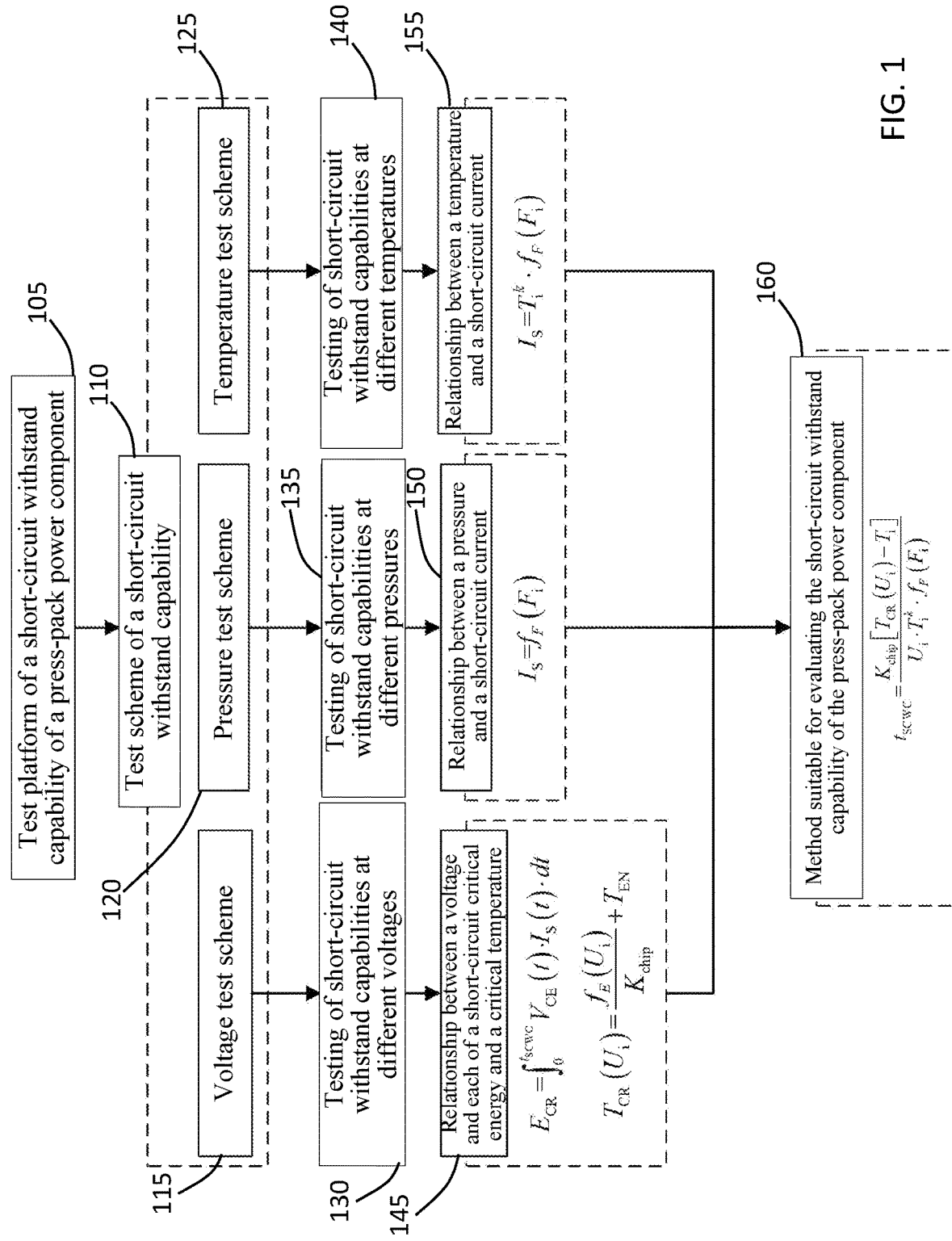
FIG. 1 is a flowchart of a method for testing and evaluating a short-circuit withstand capability of a press-pack power component according to the present disclosure.

The implementations of the present disclosure are described below through specific examples, and those skilled in the art can easily understand other advantages and effects of the present disclosure from the contents disclosed in this specification. The present disclosure can also be implemented or applied through other different specific implementations. Based on different viewpoints and applications, various modifications or amendments can be made to various details of this specification without departing from the spirit of the present disclosure. It should be noted that the diagrams provided in the following embodiments merely illustrate the basic conception of the present disclosure only schematically, and the following embodiments or features in the embodiments may be combined in a non-conflicting manner.

The accompanying drawings are schematic diagrams rather than physical diagrams, which are only for illustrative description and should not be construed as a limitation to the present disclosure. In order to better describe the embodiments of the present disclosure, some components may be omitted, enlarged or reduced in the accompanying drawings, and thus do not represent true sizes of physical products. Those skilled in the art should understand that some well-known structures and descriptions thereof may be omitted in the accompanying drawings.

The same or similar labels in the accompanying drawings of the embodiment of the present disclosure correspond to the same or similar components. In the description of the present disclosure, it should be understood that orientation or position relationships indicated by terms such as "upper", "lower", "left", "right", "front" and "rear" are orientation or position relationships as shown in the drawings. These terms are merely intended to facilitate and simplify the description of the present disclosure, rather than to indicate or imply that the mentioned device or components must have a specific orientation or must be constructed and operated in a specific orientation. Therefore, the terms describing the positional relationship in the accompanying drawings are only used for illustrative description, and should not be understood as a limitation to the present disclosure. A person of ordinary skill in the art will understand specific meanings of such terms based on a specific situation.

Figure 2:
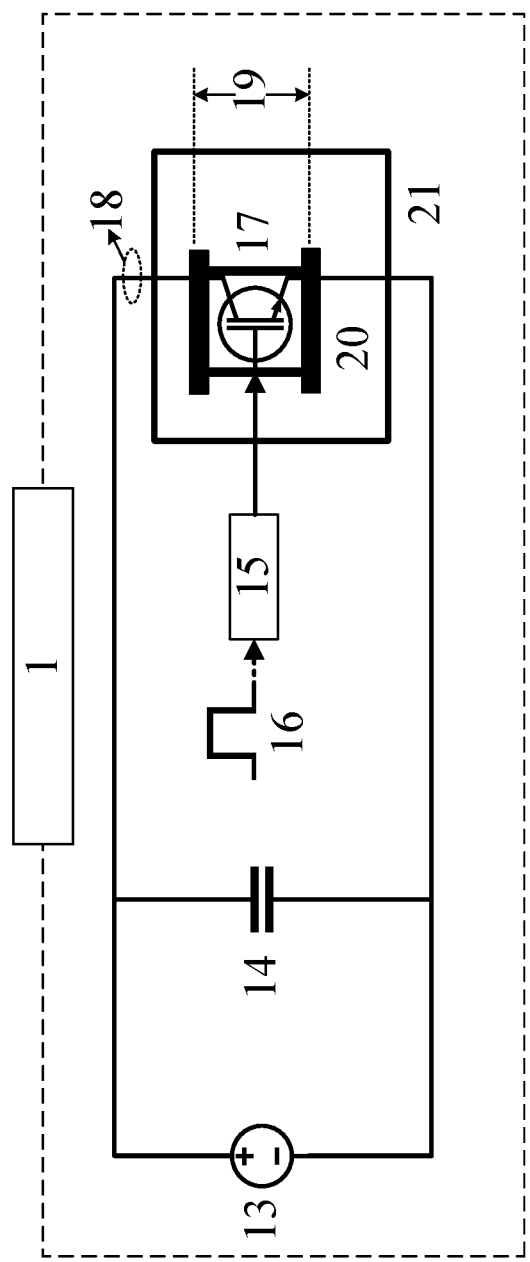
FIG. 2 is a diagram of a principle of a test platform of a short-circuit withstand capability of a press-pack power component according to the present disclosure.

In FIG. 2, 1—test platform of a short-circuit withstand capability of a press-pack power component, 13—High-voltage DC power supply (voltage control), 14—Capacitor group, 15—Drive circuit, 16—Signal generator, 17—To-be-tested component, 18—voltage probe, 19—Current probe, 20—Pressure fixture, 21 Constant-temperature experimental box.

Referring to FIG. 1 and FIG. 2, as shown in FIG. 1, a method 100 for testing and evaluating a short-circuit withstand capability of a press-pack power component provided in the present disclosure includes the following operation steps:

In FIG. 1, the method includes at 105 building a test platform of a short-circuit withstand capability of a press-pack power component. At 110, the method 110 includes implementing a test scheme of a short-circuit withstand capability. The implementing the test scheme of a short-circuit withstand capability includes at 115, implementing a Voltage test scheme, at 120, implementing a Pressure test scheme, and at 125 implementing a Temperature test scheme within a Maximum junction temperature fluctuation range. At 130, the implementing the voltage test scheme includes further includes a Testing of short-circuit withstand capabilities at different voltages. At 135, implementing the pressure test scheme further includes Testing of short-circuit withstand capabilities at different pressures. At 140, implementing the temperature test scheme includes Testing of short-circuit withstand capabilities at different temperatures. At 145, implementing the voltage test scheme includes obtaining a relationship between a test voltage and a short-circuit critical energy $E_{CR}$, and obtaining a relationship between a test voltage a critical temperature $T_{CR}$. At 150, the implementing the pressure test scheme includes fitting a relationship between a test pressure and a short-circuit current. At 155, implementing the temperature test scheme further includes obtaining a Relationship between a temperature and a short-circuit current. At 160, the method 100 includes evaluating the short-circuit withstand capability of the press-pack power component using the obtained relationships and results.

The method 100 is discussed in further detail in the context of FIG. 2.

Referring back to 105 of FIG. 1, which involves Establishing a test platform suitable for a short-circuit withstand capability of a press-pack power component. As shown in FIG. 2, the test platform includes a short-circuit energy supply module, a control module, a measurement module, and an environment control module, where the short-circuit energy supply module includes a high-voltage direct current (DC) power supply and a capacitor group, to provide impact energy for a short-circuit withstand test;

the control module includes a signal generator and a drive circuit, to control a to-be-tested module to be enabled;

the measurement module includes a voltage probe and a current probe, to monitor and acquire characteristic parameters such as a short-circuit current $I_S$, a collector-emitter voltage $V_{CE}$, and a grid-emitter voltage $V_{GE}$ in a process of the short-circuit withstand test; and the environment control module includes a high-voltage DC power supply, a pressure fixture, and a constant-temperature experimental box, to respectively control changes of a voltage, a pressure, and a temperature.

The method 100 of FIG. 1 includes steps 115-125 of which involve Obtaining a voltage level, a pressure load, an environment temperature, and a maximum junction temperature fluctuation range of a to-be-tested press-pack power component in an actual working condition, customize a test scheme of the short-circuit withstand capability, and determine a test voltage a test pressure $F_i$, and a test temperature $T_i$.

The test voltage $U_i$ includes ±10% steps of an actual working voltage $U_0$ so that testing is performed at voltage levels including $U_0-20\%$, $U_0-10\%$, $U_0$, $U_0+10\%$, and $U_0+20\%$; According to a specific application condition, a voltage test range may be increased and the step may be reduced. For example, a power component applied in a working condition of 1000 V should be tested at least at 800 V, 900 V, 1000 V, 1100 V, and 1200 V voltage levels.

The test pressure $F_i$ uses a recommended pressure load value $F_0$ of the to-be-tested press-pack power component in the actual working condition as a reference, and a maximum pressure load value $F_{0\text{-}max}$ as an upper limit; within the test pressure $F_i \in (0, F_0]$ interval, testing is performed at least at 5 pressure levels within $(0, F_0/2]$ interval, testing is performed at least at 3 pressure levels; and within the test pressure $F_i \in (F_0, F_{0\text{-}max}]$ interval, testing is performed at least at 2 pressure levels. According to a specific application condition, a quantity of test pressure levels may be increased. For example, for a DG50N3300-crimp-typed IGBT component, within the test pressure $F_i \in (0, 1000]$ interval, testing is performed at least at pressure levels of 100 N, 200 N, 500 N, 800 N, and 1000 N. Within the test pressure $F_i \in (1000, 2000]$ interval, testing is performed at least at pressure levels of 1500 N and 2000 N.

The test temperature $T_i$ includes one or more values between $T_{EN\_min}$ actual application as a lower limit, and a maximum junction temperature $T_{j\_max}$ as an upper limit; where the application working condition includes a minimum value $T_{j\_min}$ of junction temperature fluctuation, and testing is performed at least at 4 temperature levels. According to a specific application condition, a quantity of test temperature levels may be increased, and a test temperature range may be appropriately adjusted. For example, in an application working condition that the minimum environment temperature $T_{EN\_min}$ is 25° C., the maximum junction temperature $T_{j\_max}$ is 100° C., and the minimum value $T_{j\_min}$ of junction temperature fluctuation is 75° C., testing is performed at least at temperature levels of 25° C., 50° C., 75° C., and 100° C.

The method 100 includes step 130, which includes Testing short-circuit withstand capabilities of the to-be-tested press-pack power component at different voltage levels, and monitor, in real time, changes of a component short-circuit current $I_S$, a collector-emitter voltage $V_{CE}$, and a grid-emitter voltage $V_{GE}$ until the to-be-tested press-pack power component fails due to short circuit; when the short-circuit current $I_S$ instantly rises to at least 2 times an initial value and the collector-emitter voltage $V_{CE}$ drops rapidly to about 0 V, it can be determined that the to-be-tested press-pack power component fails due to short circuit.

At 145, the step includes calculating a short-circuit critical energy $E_{CR}$ of the to-be-tested press-pack power component based on the short-circuit current $I_S$ and the collector-emitter voltage $V_{CE}$ according to equation:

$$E_{CR} = \int_0^{t_{SCWC}} V_{CE}(t) \cdot I_S(t) \cdot dt, \text{ where}$$

$t_{SCWC}$ is a short-circuit withstand time of the to-be-tested press-pack power component, namely, a maintenance time from a beginning of testing to a short-circuit failure of the to-be-tested press-pack power component; fit a relationship between a test voltage Um and a short-circuit critical energy $E_{CR}$ based on test results at the different voltage levels according to equation:

$$E_{CR} = f_E(U_i); \text{ and}$$

obtaining a relationship between a test voltage $U_i$ and a critical temperature $T_{CR}$ according to equation:

$$T_{CR}(U_i) = \frac{f_E(U_i)}{K_{chip}} + T_{EN},$$

where $K_{chip}$ is a parameter related to a material and a structure of a chip used by the to-be-tested press-pack power component, and $T_{EN}$ is the environment temperature.

At 135, implementing the pressure test scheme 120 includes testing short-circuit withstand capabilities of the to-be-tested press-pack power component at different pressure levels, and monitor, in real time, changes of a component short-circuit current $I_S$, a collector-emitter voltage $V_{CE}$, and a grid-emitter voltage $V_{GE}$ until the to-be-tested press-pack power component fails due to short circuit; when the short-circuit current $I_S$ instantly rises to at least 2 times an initial value and the collector-emitter voltage $V_{CE}$ drops rapidly to about 0 V, it can be determined that the to-be-tested press-pack power component fails due to short circuit; and At 150 implementing the pressure test scheme includes obtain a relationship between a test pressure $F_i$ and a component short-circuit current $I_S$ according to equation:

$$I_S = f_F(F_i)$$

At 140, implementing the temperature test scheme includes testing short-circuit withstand capabilities of the to-be-tested press-pack power component at different temperature levels, and monitor, in real time, changes of a component short-circuit current $I_S$, a collector-emitter voltage $V_{CE}$, and a grid-emitter voltage $V_{GE}$ until the to-be-tested press-pack power component fails due to short circuit; when the short-circuit current $I_S$ instantly rises to at least 2 times an initial value and the collector-emitter voltage $V_{CE}$ drops rapidly to about 0 V, it can be determined that the to-be-tested press-pack power component fails due to short circuit. At 155, implementing the temperature test scheme includes obtaining a relationship between a temperature $T_i$ and a component short-circuit current $I_S$ according to equation:

$$I_S = T_i^k f_F(F_i), \text{ where}$$

k is a parameter related to a characteristic of a chip used by the to-be-tested press-pack power component.

At 160, the method 100 includes evaluating, according to test results obtained under different voltages, pressures, and temperatures, a short-circuit withstand capability of a to-be-tested press-pack power component according to equation:

$$t_{SCWC} = \frac{K_{chip}[T_{CR}(U_i) - T_i]}{U_i \cdot T_i^k \cdot f_F(F_i)}$$

It can be learned from the foregoing description that the method for testing and evaluating a short-circuit withstand capability of a press-pack power component provided in the present disclosure comprehensively considers the application working condition of the to-be-tested press-pack power component, namely, impact of "current-thermal-mechanical". Compared with a currently widely used method for testing and evaluating a short-circuit withstand capability based on a welding-packaged power component, which only considers impact of "current-thermal", this method comprehensively considers a package structure and the application working condition of the press-pack power component, thereby improving evaluation accuracy.

It should be noted that the above embodiments are only intended to explain, rather than to limit the technical solutions of the present disclosure. Although the present disclosure is described in detail with reference to the preferred embodiments, those skilled in the art should understand that modifications or equivalent substitutions may be made to the technical solutions of the present disclosure without departing from the spirit and scope of the technical solutions of the present disclosure, and such modifications or equivalent substitutions should be included within the scope of the claims of the present disclosure.

What is claimed is:

1. A method for testing and evaluating a short-circuit withstand capability of a press-pack power component, wherein the method comprises the following steps:

S1: building a test platform suitable for a short-circuit withstand capability of a press-pack power component;

S2: obtaining a voltage level, a pressure load, an environment temperature, and a maximum junction temperature fluctuation range of a to-be-tested press-pack power component in an actual working condition;

S3: customizing a test scheme of the short-circuit withstand capability, which comprises: separately testing short-circuit withstand capabilities of the to-be-tested press-pack power component at different voltage, pressure, and temperature levels; monitoring, in real time, changes of a component short-circuit current $I_S$, a collector-emitter voltage $V_{CE}$, and a grid-emitter voltage $V_{GE}$ until the to-be-tested press-pack power component fails due to short circuit; and correspondingly obtaining a relationship between a voltage and each of a short-circuit critical energy $E_{CR}$ and a critical temperature $T_{CR}$, a relationship between a pressure and a short-circuit current, and a relationship between a temperature and a short-circuit current; and S4: obtaining, according to test results obtained under different voltages, pressures, and temperatures, a relationship between a short-circuit withstand capability of the to-be-tested press-pack power component and each of a voltage, a pressure, and a temperature.

2. The method for testing and evaluating a short-circuit withstand capability of a press-pack power component according to claim 1, wherein in step S1, the test platform comprises a short-circuit energy supply module, a control module, a measurement module, and an environment control module;

the short-circuit energy supply module comprises a high-voltage direct current (DC) power supply and a capacitor group that are connected in parallel, to provide impact energy for a short-circuit withstand test;

the control module comprises a signal generator and a drive circuit that are connected in series, to control a to-be-tested module to be enabled;

the measurement module comprises a voltage probe and a current probe, to monitor and acquire a short-circuit current $I_S$, a collector-emitter voltage $V_{CE}$, a grid-emitter voltage $V_{GE}$ in a process of the short-circuit withstand test; and the environment control module comprises a high-voltage DC power supply, a pressure fixture, and a constant-temperature experimental box, to respectively control changes of a voltage, a pressure, and a temperature.

3. The method for testing and evaluating a short-circuit withstand capability of a press-pack power component according to claim 1, wherein in step S2, a test voltage $U_i$, a test pressure $F_i$, and a test temperature $T_i$ are determined according to the actual working condition of the to-be-tested press-pack power component, wherein the test voltage $U_i$ uses an actual working voltage $U_0$ as a reference, and $\pm 10\%$ as a step, and testing is performed at least at 5 voltage levels, namely, $U_0-20\%$, $U_0-10\%$, $U_0$, $U_0+10\%$, and $U_0+20\%$;

the test pressure $F_i$ uses a recommended pressure load value $F_0$ of the to-be-tested press-pack power component in the actual working condition as a reference, and a maximum pressure load value $F_{0-max}$ as an upper limit; within the test pressure $F_i \in (0, F_0]$ interval, testing is performed at least at 5 pressure levels within $(0, F_0/2]$ interval, testing is performed at least at 3 pressure levels; and within the test pressure $F_i \in (F_0, F_{0-max}]$ interval, testing is performed at least at 2 pressure levels; and the test temperature $T_i$ includes one or more values between TEN min in actual application as a lower limit, and a maximum junction temperature $T_{j\_max}$ as an upper limit; a minimum value $T_{j\_min}$ of junction temperature fluctuation in the application working condition is comprised, and testing is performed at least at 4 temperature levels.

4. The method for testing and evaluating a short-circuit withstand capability of a press-pack power component according to claim 1, wherein in step S3, a short-circuit current $I_S$ and a collector-emitter voltage $V_{CE}$ are monitored in real time in a process of testing the short-circuit withstand capability, and when the short-circuit current $I_S$ instantly rises to at least 2 times an initial value and the collector-emitter voltage $V_{CE}$ drops rapidly to about 0 V, it is determined that the to-be-tested press-pack power component fails due to short circuit.

5. The method for testing and evaluating a short-circuit withstand capability of a press-pack power component according to claim 1, wherein in step S3, the testing short-circuit withstand capabilities of the to-be-tested press-pack power component at different voltage levels comprises: separately testing a short-circuit withstand capability of the to-be-tested press-pack power component at a selected voltage level, and monitoring, in real time, a component short-circuit current $I_S$, a collector-emitter voltage $V_{CE}$, and a grid-emitter voltage $V_{GE}$ until the to-be-tested press-pack power component fails due to short circuit;

(1) calculating a short-circuit critical energy $E_{CR}$ of the to-be-tested press-pack power component based on the short-circuit current $I_S$ and the collector-emitter voltage $V_{CE}$:

$$E_{CR} = \int_0^{t_{SCWC}} V_{CE}(t) \cdot I_S(t) \cdot dt, \text{ wherein}$$

$t_{SCWC}$ is a short-circuit withstand time of the to-be-tested press-pack power component, namely, a maintenance time from a beginning of testing to a short-circuit failure of the to-be-tested press-pack power component;

(2) fitting a relationship between a test voltage $U_i$ and a short-circuit critical energy $E_{CR}$ based on the test results at the different voltage levels:

$E_{CR}=f_E(U_i)$, wherein $f_E(U_i)$ is a fitting relationship function between a test voltage $U_i$ and a short-circuit critical energy $E_{CR}$; and (3) obtaining a relationship between a test voltage $U_i$ and a critical temperature $T_{CR}$:

$$T_{CR}(U_i) = \frac{f_E(U_i)}{K_{chip}} + T_{EN},$$

wherein $K_{chip}$ is a parameter related to a material and a structure of a chip used by the to-be-tested press-pack power component, and $T_{EN}$ is the environment temperature.

6. The method for testing and evaluating a short-circuit withstand capability of a press-pack power component according to claim 1, wherein in step S3, the testing short-circuit withstand capabilities of the to-be-tested press-pack power component at different pressure levels comprises: separately testing a short-circuit withstand capability of the to-be-tested press-pack power component at a selected pressure level, and monitoring, in real time, changes of a component short-circuit current $I_S$, a collector-emitter voltage $V_{CE}$, and a grid-emitter voltage IGE until the to-be-tested press-pack power component fails due to short circuit; and fitting a relationship between a test pressure $F_i$ and a component short-circuit current $I_S$ based on the test results at the different pressure levels:

$I_S=f_F(F_i)$, wherein $f_F(F_i)$ is a fitting relationship function between the test pressure $F_i$ and the component short-circuit current $I_S$.

7. The method for testing and evaluating a short-circuit withstand capability of a press-pack power component according to claim 1, wherein in step S3, the testing short-circuit withstand capabilities of the to-be-tested press-pack power component at different temperature levels comprises: separately testing a short-circuit withstand capability of the to-be-tested press-pack power component at a selected temperature level, and monitoring, in real time, changes of a component short-circuit current $I_S$, a collector-emitter voltage $V_{CE}$, and a grid-emitter voltage $V_{GE}$ until the to-be-tested press-pack power component fails due to short circuit; and fitting a relationship between a temperature $T_i$ and a component short-circuit current $I_S$ based on the test results at the different temperature levels:

$I_S=T_i^k \cdot f_F(F_i)$, wherein k is a parameter related to a characteristic of a chip used by the to-be-tested press-pack power component, and $f_F(F_i)$ is a fitting relationship function between a test pressure $F_i$ and the component short-circuit current $I_S$.

8. The method for testing and evaluating a short-circuit withstand capability of a press-pack power component according to claim 1, wherein in step S4, an obtained relationship between a short-circuit withstand capability of the to-be-tested press-pack power component and each of a voltage, a pressure, and a temperature is:

$$t_{SCWC} = \frac{K_{chip}[T_{CR}(U_i) - T_i]}{U_i \cdot T_i^k \cdot f_F(F_i)},$$

wherein $K_{chip}$ is a parameter related to a material and a structure of a chip used by the to-be-tested press-pack power component, $T_{CR}$ is the critical temperature, $U_i$ is a test voltage, $T_i$ is a test temperature, k is a parameter related to a characteristic of the chip used by the to-be-tested press-pack power component, and $f_F(F_i)$ is a fitting relationship function between a test pressure $F_i$ and the component short-circuit current $I_S$.

* * * * *